United States Patent
Bae et al.

(10) Patent No.: US 12,410,289 B2
(45) Date of Patent: Sep. 9, 2025

(54) PREPARATION OF ION EXCHANGE MEMBRANES FROM POLYOLEFINS AND POLYCYCLIC OLEFINS

(71) Applicant: RENSSELAER POLYTECHNIC INSTITUTE, Troy, NY (US)

(72) Inventors: Chulsung Bae, Cohoes, NY (US); Jong Yeob Jeon, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 859 days.

(21) Appl. No.: 17/282,512

(22) PCT Filed: Oct. 7, 2019

(86) PCT No.: PCT/US2019/054924
§ 371 (c)(1),
(2) Date: Apr. 2, 2021

(87) PCT Pub. No.: WO2020/073035
PCT Pub. Date: Apr. 9, 2020

(65) Prior Publication Data
US 2021/0380771 A1     Dec. 9, 2021

Related U.S. Application Data

(60) Provisional application No. 62/741,811, filed on Oct. 5, 2018.

(51) Int. Cl.
*C08J 5/22*     (2006.01)
*C08F 210/02*   (2006.01)
(Continued)

(52) U.S. Cl.
CPC .......... *C08J 5/2243* (2013.01); *C08F 210/02* (2013.01); *C08F 210/18* (2013.01);
(Continued)

(58) Field of Classification Search
CPC .... C08J 5/2243; C08J 2351/06; C08F 210/02; C08F 210/18; C08F 2420/00; C08F 10/02; C08F 10/18; C08L 23/0823
See application file for complete search history.

(56) References Cited

U.S. PATENT DOCUMENTS 4,433,082 A     2/1984   Grot
5,403,675 A     4/1995   Ogata et al.
(Continued)

FOREIGN PATENT DOCUMENTS

WO    2019191225 A1    10/2019

OTHER PUBLICATIONS

Noonan, K.J.T. et al. Phosphonium-Functionalized Polyethylene: A New Class of Base-Stable Alkaline Anion Exchange Membranes. J. Am. Chem. Soc. 2012, 134, 18161-18164. (Year: 2012).*
(Continued)

*Primary Examiner* — Christina H. W. Rosebach
(74) *Attorney, Agent, or Firm* — Barclay Damon LLP; Anthony P. Gangemi (57) ABSTRACT

Ion exchange membranes for use in electrochemical energy conversion and storage applications include copolymers having a backbone produced from an olefin, such as ethylene, and a cyclic olefin, such as norbornene. Haloalkyl side chains with terminal halide groups are connected to the polymer backbone via Friedel-Crafts alkylation. The halide groups are then replaced with ionic groups via substitution. The ion exchange membrane material can then be cast or impregnated into a reinforcing mesh to form cation exchange membrane or anion exchange membranes. Rigidity of the ion exchange membranes can be controlled by varying the ratio of olefin to cyclic olefin in the polymer backbone.

3 Claims, 9 Drawing Sheets

(51) Int. Cl.
*C08F 210/18* (2006.01)
*C08L 23/0807* (2025.01)

(52) U.S. Cl.
CPC ...... *C08L 23/0823* (2013.01); *C08F 2420/00* (2013.01); *C08J 2351/06* (2013.01)

(56) References Cited

U.S. PATENT DOCUMENTS

| | | | |
|---|---|---|---|
| 5,438,082 | A | 8/1995 | Helmer-Metzmann et al. |
| 6,761,989 | B2 | 7/2004 | Terahara et al. |
| 8,075,219 | B2 | 12/2011 | Greville |
| 2008/0045477 | A1 | 2/2008 | Antoniadou-Vyza et al. |
| 2008/0171252 | A1 | 7/2008 | Hirano et al. |
| 2009/0156770 | A1* | 6/2009 | Komatsu ................ C08G 61/08 526/281 |
| 2010/0022672 | A1 | 1/2010 | Yoshimura |
| 2010/0093955 | A1* | 4/2010 | Choi ..................... C08F 290/00 526/90 |
| 2010/0166966 | A1 | 7/2010 | Chang et al. |
| 2011/0143260 | A1* | 6/2011 | Bell ....................... B01D 71/44 521/38 |
| 2012/0149945 | A1 | 6/2012 | Campbell et al. |
| 2012/0208976 | A1 | 8/2012 | Sunaga et al. |
| 2016/0276689 | A1 | 9/2016 | Onomichi et al. |

OTHER PUBLICATIONS

International Search Report and The Written Opinion of the International Searching Authority, International Application No. PCT/US2019/054924, mailed Feb. 6, 2020.

Noonan, K.J.T. et al., "Phosphonium-Functionalized Polyethylene: A New Class of Base-Stable Alkaline Anion Exchange Membranes," Journal of the American Chemical Society, vol. 134, pp. 18161-18164, Sep. 27, 2012.

He, X. et al., "Novel quaternary ammonium functional addition-type norbornene copolymer as hydroxide-conductive and durable anion exchange membrane for direct methanol fuel cells," Royal Society of Chemistry Advances, vol. 5, pp. 63215-63225, Jul. 22, 2015.

* cited by examiner

PREPARATION OF ION EXCHANGE MEMBRANES FROM POLYOLEFINS AND POLYCYCLIC OLEFINS

CROSS REFERENCE TO RELATED APPLICATIONS

This application is a national stage filing of International Patent Application No. PCT/US2019/054924, filed Oct. 7, 2019, which claims the benefit of U.S. Provisional Patent Application No. 62/741,811, filed on Oct. 5, 2018, which is incorporated herein by reference in its entirety.

STATEMENT REGARDING FEDERALLY SPONSORED RESEARCH OR DEVELOPMENT

This invention was made with government support under 1534289 awarded by National Science Foundation and DE-EE0008432 awarded by the United States Department of Energy. The government has certain rights in the invention.

BACKGROUND

Alkaline exchange membrane (AEM) are a component for anion-based electrochemical energy technology, such as fuel cells, electrolyzers, and advanced batteries. They have drawn significant attention as promising alternatives to proton exchange membrane (PEM) based energy conversion devices, which require expensive platinum group metal (PGM) catalysts and acid-tolerant stack hardware. For example, due to slow rates of corrosion under alkaline conditions, AEM fuel cells could use PGM-free electrocatalysts and less expensive metal hardware. Faster kinetics of the oxygen reduction reaction at the cathode in an alkaline environment is another major benefit of AEM fuel cells. However, the lack of standard AEM has been the main bottleneck for practical application of AEMs in electrochemical energy conversion and storage technologies. For AEM to be successfully adopted in electrochemical devices, it needs to satisfy several key properties: (i) robust chemical stability at high pH and temperature >80° C., (ii) high ion conductivity/low area specific resistance (ASR), (iii) good mechanical properties (tensile strength and elongation), (iv) conveniently scalable synthesis, and (v) low manufacturing cost. Although numerous AEMs have been introduced in the past decade, there is no AEM that satisfy all these criteria simultaneously.

SUMMARY

Some embodiments of the present disclosure are directed to an ion exchange membrane material including a polymer according to Formula I:

(Formula I)

In some embodiments, R1 is a hydrocarbyl chain, R2 is one or more bridged cyclic hydrocarbyl groups, and S is one or more side chains including a hydrocarbyl chain, a phenyl group, and an ionic group. In some embodiments, R1 includes one or more alkanes. In some embodiments, R2 includes a plurality of bridged cyclic hydrocarbyl groups. In some embodiments, the bridged cyclic hydrocarbyl group includes one or more norbornanes. In some embodiments, the ionic group includes one or more ammonium groups, one or more multication hydrocarbyl chains, one or more spiro-type ammonium groups, one or more sulfonate groups, one or more phosphonate groups, one or more carboxylate groups, one or more alcohols, one or more amines, or combinations thereof. In some embodiments, the polymer includes the structure according to Formula II:

(Formula II)

In some embodiments, m+n=1, x≥2, Ak is a hydrocarbyl group, and R3 is an ionic group. In some embodiments, m is between about 0.1 and about 0.5.

Some embodiments of the present disclosure are directed to methods of making an ion exchange membrane material, e.g., a polymeric material. In some embodiments, the method includes providing a reaction medium including an olefin, a cyclic olefin, and an acid catalyst. In some embodiments, the method includes copolymerizing a polymer backbone from the olefin and the cyclic olefin. In some embodiments, the method includes grafting one or more haloalkyl side chains to the polymer backbone, the haloalkyl side chains including a halide. In some embodiments, the method includes substituting the halide with an ionic group. In some embodiments, the acid catalyst is a metallocene catalyst including zinc, titanium, or combinations thereof. In some embodiments, the olefin includes ethylene and the cyclic olefin includes norbornene. In some embodiments, the cyclic olefin includes one or more norbornenes. In some embodiments, the cyclic olefin includes one or more norbornanes. In some embodiments, the cyclic olefin further includes a phenyl group, wherein the one or more haloalkyl side chains are grafted to the phenyl group.

Some embodiments of the present disclosure are directed to methods of making an ion exchange structures, e.g., membranes, electrode binder materials, etc. In some embodiments, the method includes providing olefin monomers functionalized with a phenyl group. In some embodiments, the method includes reacting the olefin monomers with cyclopentadiene to form cyclic olefin monomers. In some embodiments, the method includes combining the cyclic olefin monomers, an olefin, and an acid catalyst in a reaction medium. In some embodiments, the method includes copolymerizing a polymer backbone from the olefin and the cyclic olefin monomers. In some embodiments, the method includes grafting one or more haloalkyl side chains to the polymer backbone via Friedel-Crafts alkylation. In some embodiments, the method includes performing a substitution reaction to replace halides from the haloalkyl groups with ionic groups to form an ion exchange membrane material, e.g., a polymeric material. In some embodiments, the method includes casting the ion exchange membrane material as an ion exchange membrane, electrode binder, etc. In some embodiments, casting the ion exchange membrane material as an ion exchange membrane includes impregnating the ion exchange membrane material in a reinforcing mesh. In some embodiments, the method includes the olefin include ethylene and the cyclic olefin monomers include norbornene. In some embodiments, the method includes the cyclic olefin monomers include one or more norbornenes. In some embodiments, the method includes the cyclic olefin monomers include one or more norbornanes.

DETAILED DESCRIPTION

Some embodiments of the systems and methods of the present disclosure are directed to an ion exchange membrane material composed of one or more polymers. In some embodiments, the ion exchange membrane material is an anion exchange membrane material. In some embodiments, the ion exchange membrane material is a cation exchange membrane material. In some embodiments, the one or more polymers is a copolymer. In some embodiments, the one or more polymers is a block copolymer. In some embodiments, the one or more polymers include the following formula:

(Formula I)

In some embodiments, R1 and R2 form a polymer backbone. In some embodiments, adjacent polymer backbones in the ion exchange membrane material are crosslinked. In some embodiments, R1 is a hydrocarbyl chain. As used herein, the term "hydrocarbyl" is used to refer to saturated and unsaturated hydrocarbon compounds. In some embodiments, R1 includes one or more alkanes. In some embodiments, R1 includes polyethylene. In some embodiments, the R1 is produced via a polymerization reaction (discussed in greater detail below) with a reaction medium including one or more olefins. In some embodiments, R2 includes one or more bridged cyclic hydrocarbyl groups. In some embodiments, R2 includes a plurality of bridged cyclic hydrocarbyl groups. In some embodiments, the one or more bridged cyclic hydrocarbyl groups include one or more norbornanes.

In some embodiments, the polymer backbone includes one or more side chains S. In some embodiments, the one or more side chains S are attached to the polymer backbone at R2. In some embodiments, a plurality of side chains S are attached to R2. In some embodiments, the side chains S include one or more phenyl groups, one or more hydrocarbyl groups, one or more hydrocarbyl chains, one or more ionic groups, or combinations thereof. In some embodiments, the ionic group includes one or more ammonium groups, one or more multication hydrocarbyl chains, one or more spiro-type ammonium groups, one or more sulfonate groups, one or more phosphonate groups, one or more carboxylate groups, one or more alcohols, one or more amines, or combinations thereof.

In some embodiments, the one or more polymers include the following formula:

(Formula II)

In some embodiments, m+n=1. In some embodiments, m is between about 0.1 and about 0.5. In some embodiments, x is greater or equal to 1. In some embodiments, x is greater or equal to 2. In some embodiments, Ak is one or more hydrocarbyl groups, one or more hydrocarbyl chains, or combinations thereof. In some embodiments, Ak includes about 5 to about 10 carbon atoms. In some embodiments, Ak is fully saturated. In some embodiments, Ak includes at least one functional group. In some embodiments, the at least one function group includes one or more hydrocarbyl groups, one or more hydrocarbyl chains, or combinations thereof. In some embodiments, R3 includes one or more ionic groups. Exemplary structures consistent with embodiments of the one or more polymers of the present disclosure are shown at FIGS. 1A-1J. As shown in these figures, X includes one or more HO, halide, bicarbonate, or combinations thereof. As shown in these figures, M includes one or more H, a metal, or combinations thereof. As shown in these figures, R includes one or more H, alkyl groups, aryl groups, or combinations thereof.

Chemical/alkaline stability of ion exchange materials of the present disclosure address degradation of both polymer backbone and ionic group. Without wishing to be bound by theory, backbone stability can be improved by removing potentially labile bonds from the chemical structure of polymers. For example, aryl ether ($C_{sp2}$—O) bonds in poly(arylene ether)s, which are common backbone structure of AEMs, are prone to undergo chain scission in alkaline conditions by nucleophilic attack of hydroxide ions. Replacing the aryl ether bond with all carbon-based bonds as discussed above, the chemical stability of AEMs is significantly improved under high pH condition.

Further, and again without wishing to be bound by theory, ion conductivity of AEMs is heavily dependent on ion exchange capacity (IEC). Generally, an AEM with a high IEC shows good ion conductivity but it tends to swell excessively on hydration, causing deterioration of mechanical strength. In some embodiments, to overcome this trade-off issue, hydrophilic ionic head groups and associate water molecules are separated from hydrophobic polymer backbone, e.g., via the Ak hydrocarbyl group. The Ak hydrocarbyl group helps the formation of hydrophilic-hydrophobic microphase-separated morphology. When the ion exchange membrane material is in use in a membrane, the ionic groups enhance alkaline stability and create good microphase separated morphology to facilitate high ion transport through the material.

Figure 1A:
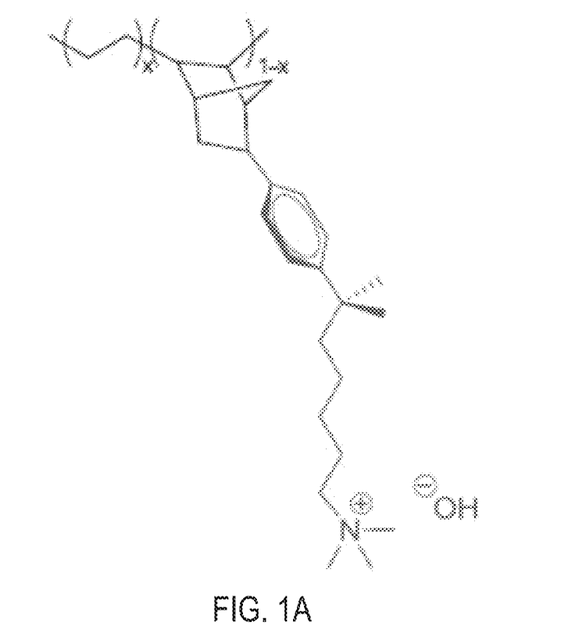
FIGS. 1A-1J are a schematic representation of an ion exchange membrane material according to some embodiments of the present disclosure.
Figure 1B:
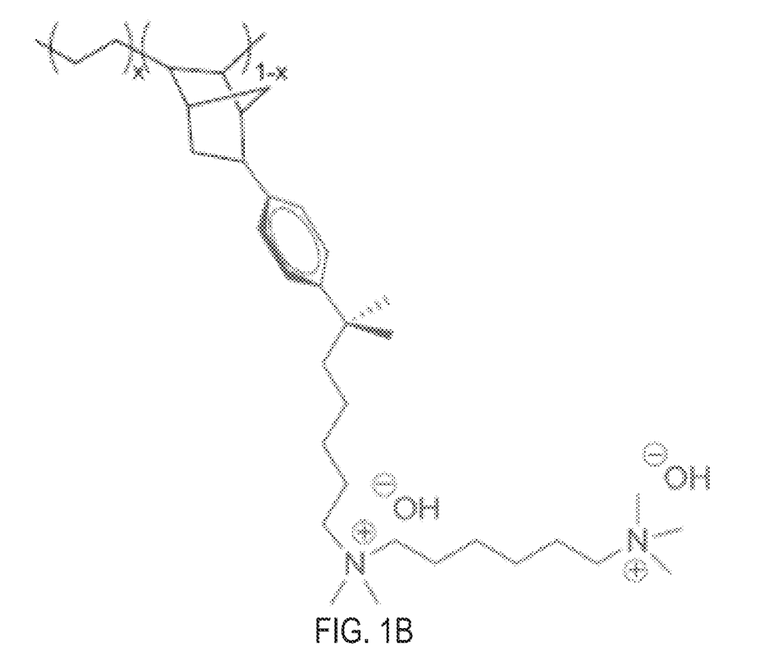
Figure 1C:
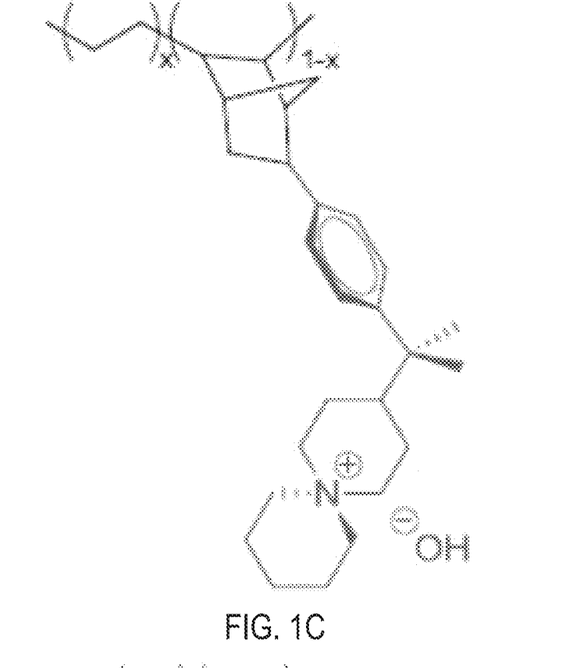
Figure 1D:
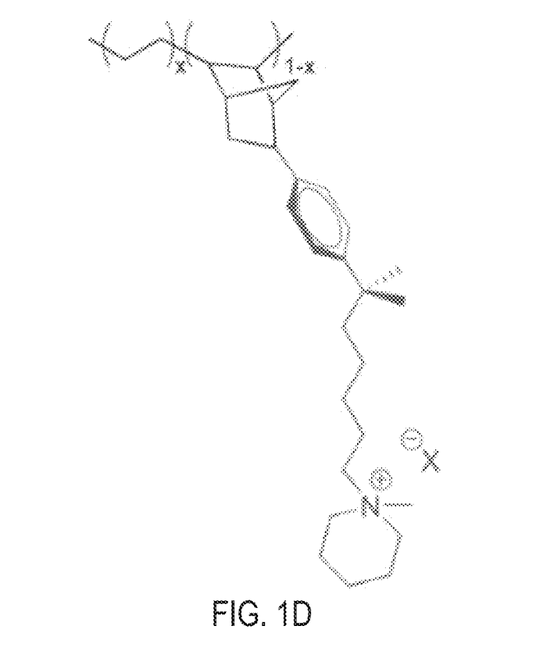
Figure 1E:
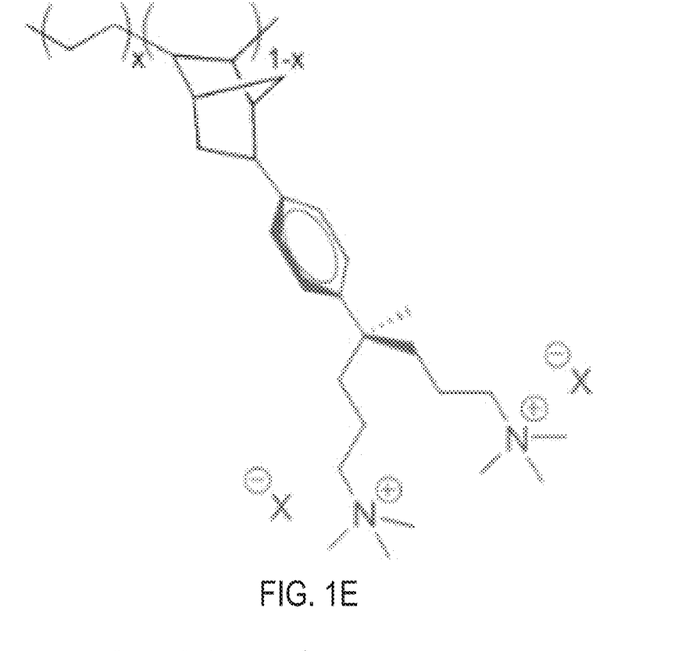
Figure 1F:
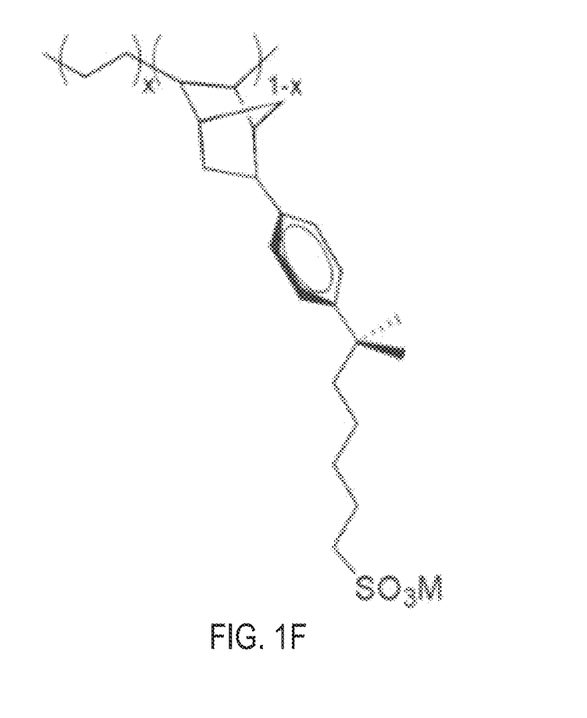
Figure 1G:
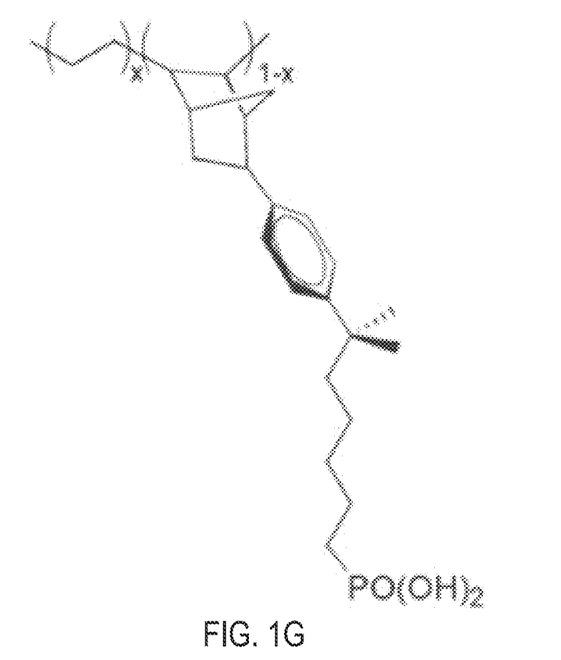
Figure 1H:
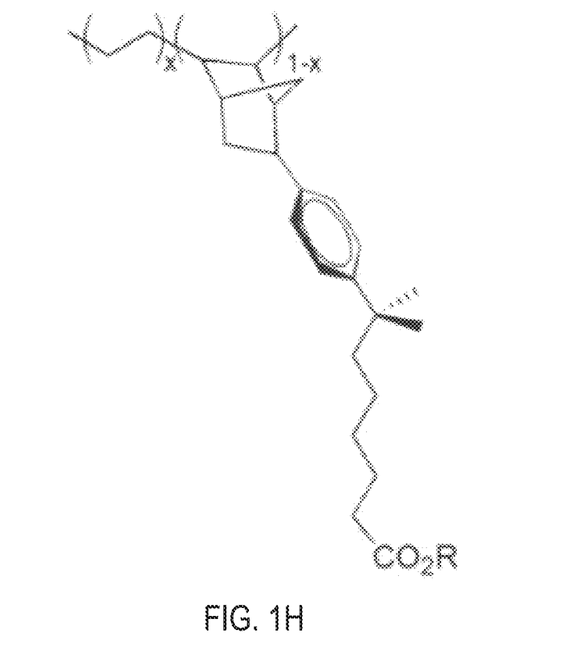
Figure 1I:
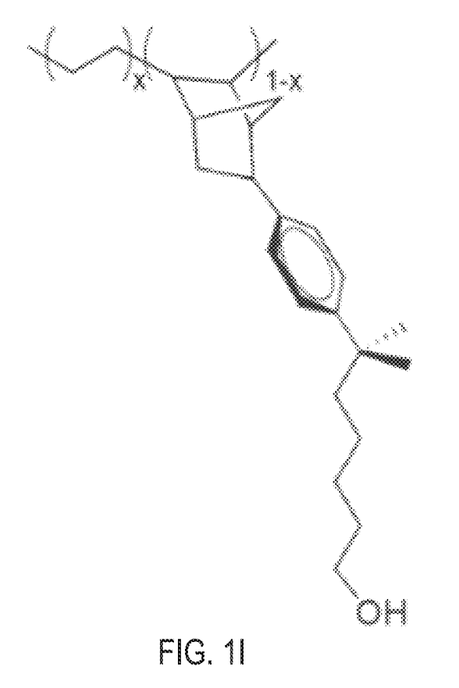
Figure 1J:
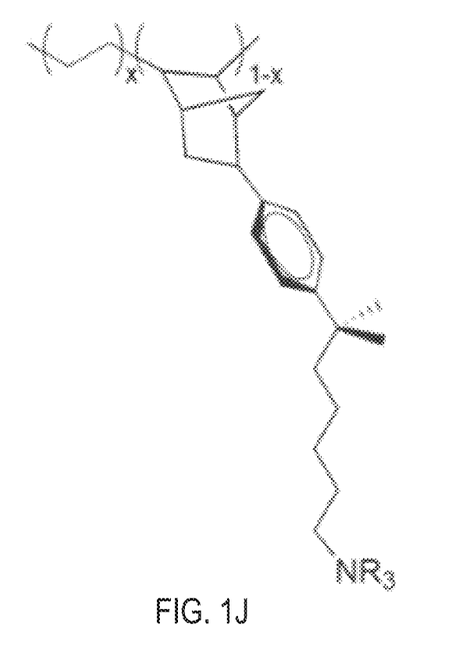
Figure 2A:
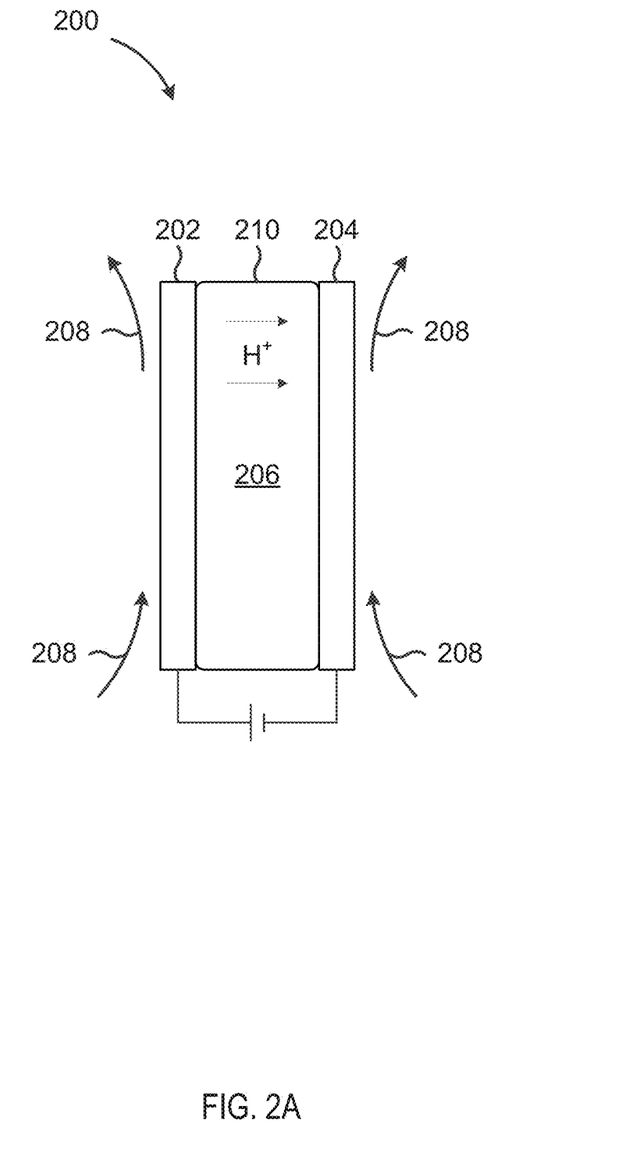
FIGS. 2A-2B are schematic drawings of electrochemical energy conversion systems including ion exchange membranes according to some embodiments of the present disclosure.
Figure 2B:
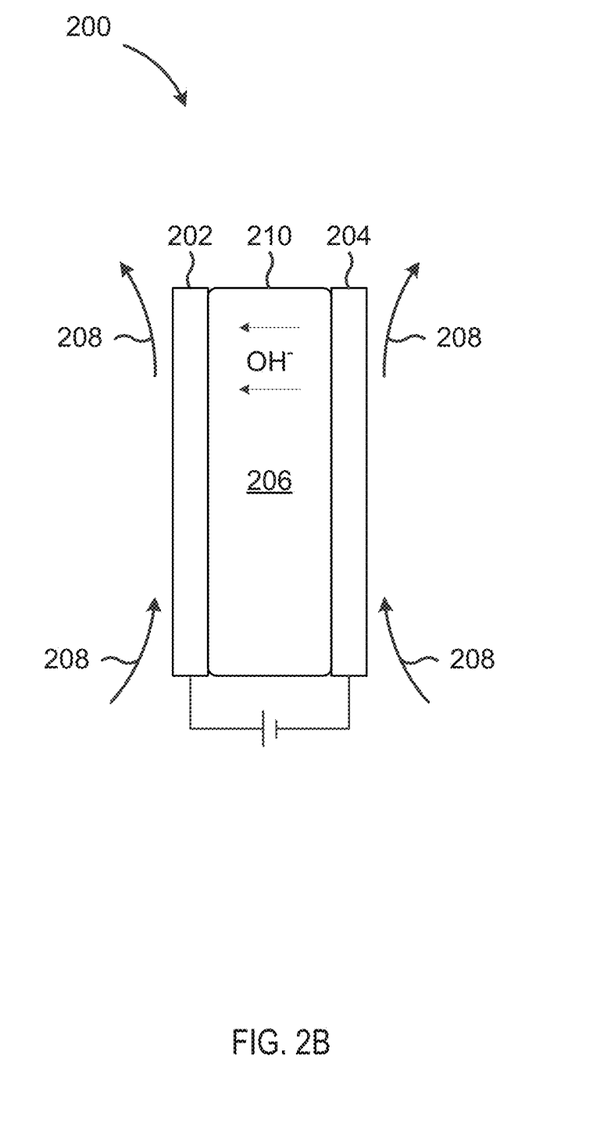

Referring now to FIGS. 2A-2B, in some embodiments, the ion exchange membrane material is incorporated into an electrochemical energy conversion system 200. In some embodiments, system 200 includes an anode 202, a cathode 204, and an electrolyte 206 disposed between the anode and the cathode. System 200 is suitable for use in numerous applications, such as fuel cells, energy recovery ventilation systems, water electrolysis systems, electrochemical hydrogen compressors, batteries, sensors, actuators, etc. In some embodiments, anode 202 and cathode 204 are composed of any suitable material for use with electrolyte 206 in system 200. In some embodiments, system 200 includes any inlets/outlets 208 to supply reactants to and remove reaction products from anode 202, cathode 204, and electrolyte 206. In some embodiments, system 200 includes a catalyst layer (not pictured).

In some embodiments, electrolyte 206 includes a solid electrolyte. In some embodiments, electrolyte 206 includes ion exchange membrane 210 including the ion exchange membrane material discussed above. In some embodiments, ion exchange membrane 210 is a cation exchange membrane (see FIG. 2A). In some embodiments, ion exchange membrane 210 is an anion exchange membrane (see FIG. 2B). In some embodiments, the ion exchange membrane 210 includes the ion exchange membrane material impregnated into and/or onto a reinforcing mesh. In some embodiments, the reinforcing mesh is composed of poly(tetrafluoroethylene), poly(ethylene terephthalate), polyethylene, polypropylene, or combinations thereof.

Figure 3:
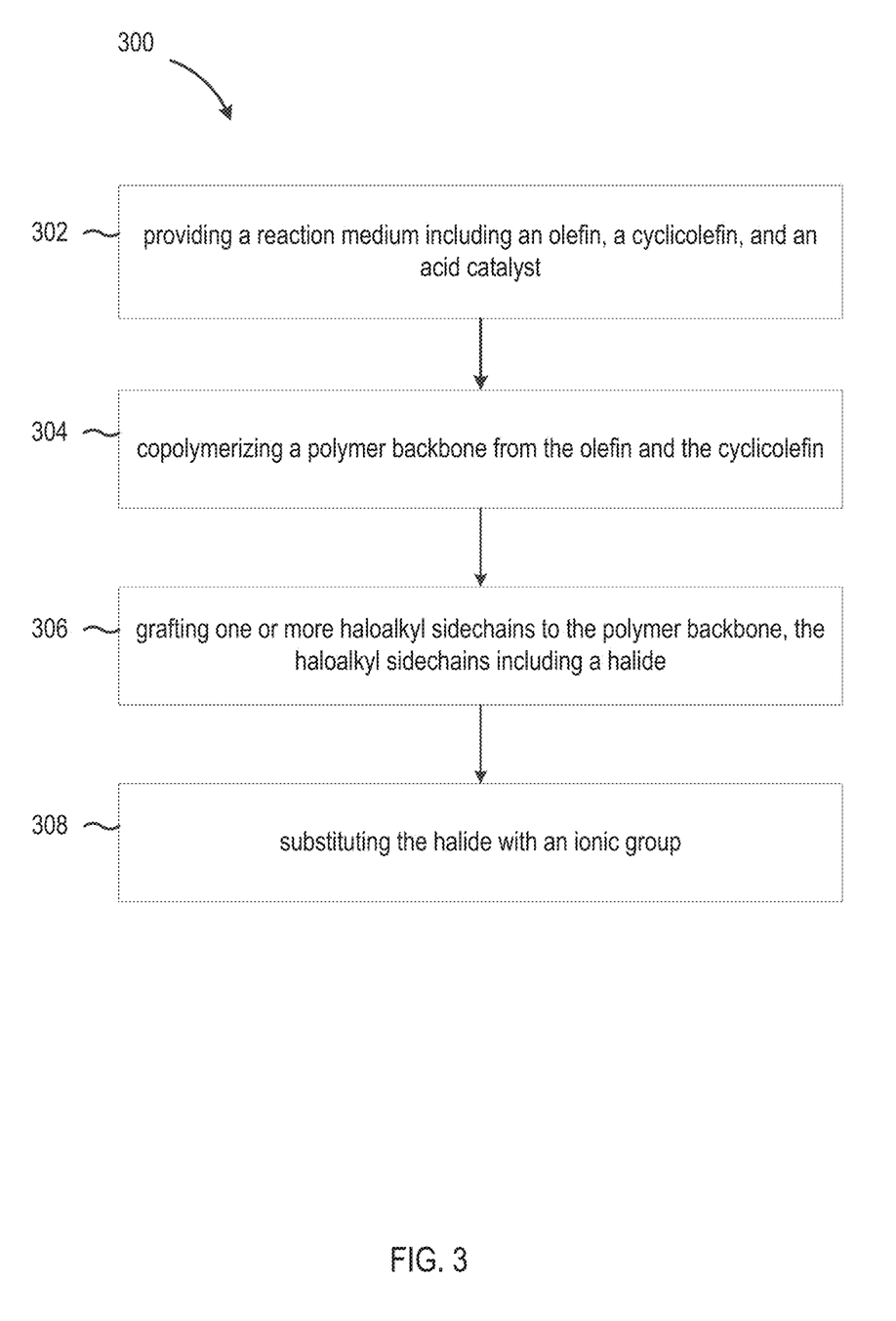
FIG. 3 is a chart of a method of making an ion exchange membrane material according to some embodiments of the present disclosure.

Referring now to FIG. 3, some embodiments of the present disclosure are directed to a method 300 of making an ion exchange membrane material. In some embodiments, at 302, a reaction medium is provided. In some embodiments, the reaction medium includes an olefin, a cyclic olefin, and an acid catalyst. In some embodiments, the molar ratio of olefin to cyclic olefin in the reaction medium is between about 10% and about 50%. In some embodiments, the olefin includes one or more functional groups. In some embodiments, the olefin includes ethylene. In some embodiments, the cyclic olefin is a multi-ring compound. In some embodiments, the cyclic olefin includes norbornene. In some embodiments, the cyclic olefin includes one or more norbornenes. In some embodiments, the cyclic olefin includes one or more norbornanes. In some embodiments, the cyclic olefin includes one or more functional groups. In some embodiments, the cyclic olefin includes one or more phenyl groups. In some embodiments, the acid catalyst is a metallocene catalyst. In some embodiments, the acid catalyst includes zinc, titanium, or combinations thereof.

At 304, a polymer backbone is copolymerized from the olefin and the cyclic olefin. At 306, one or more side chains are grafted to the polymer backbone. In some embodiments, the one or more haloalkyl side chains are grafted 306 to a phenyl group from the cyclic olefin. In some embodiments, grafting 306 is performed via Friedel-Crafts alkylation. In some embodiments, the one or more side chains include one or more haloalkyl groups. As used herein, the term "haloalkyl group" is used to refer to a compound composed of a hydrocarbon and at least one halide. At 308, at least one or the halides in the haloalkyl group is substituted with an ionic group.

Figure 4:
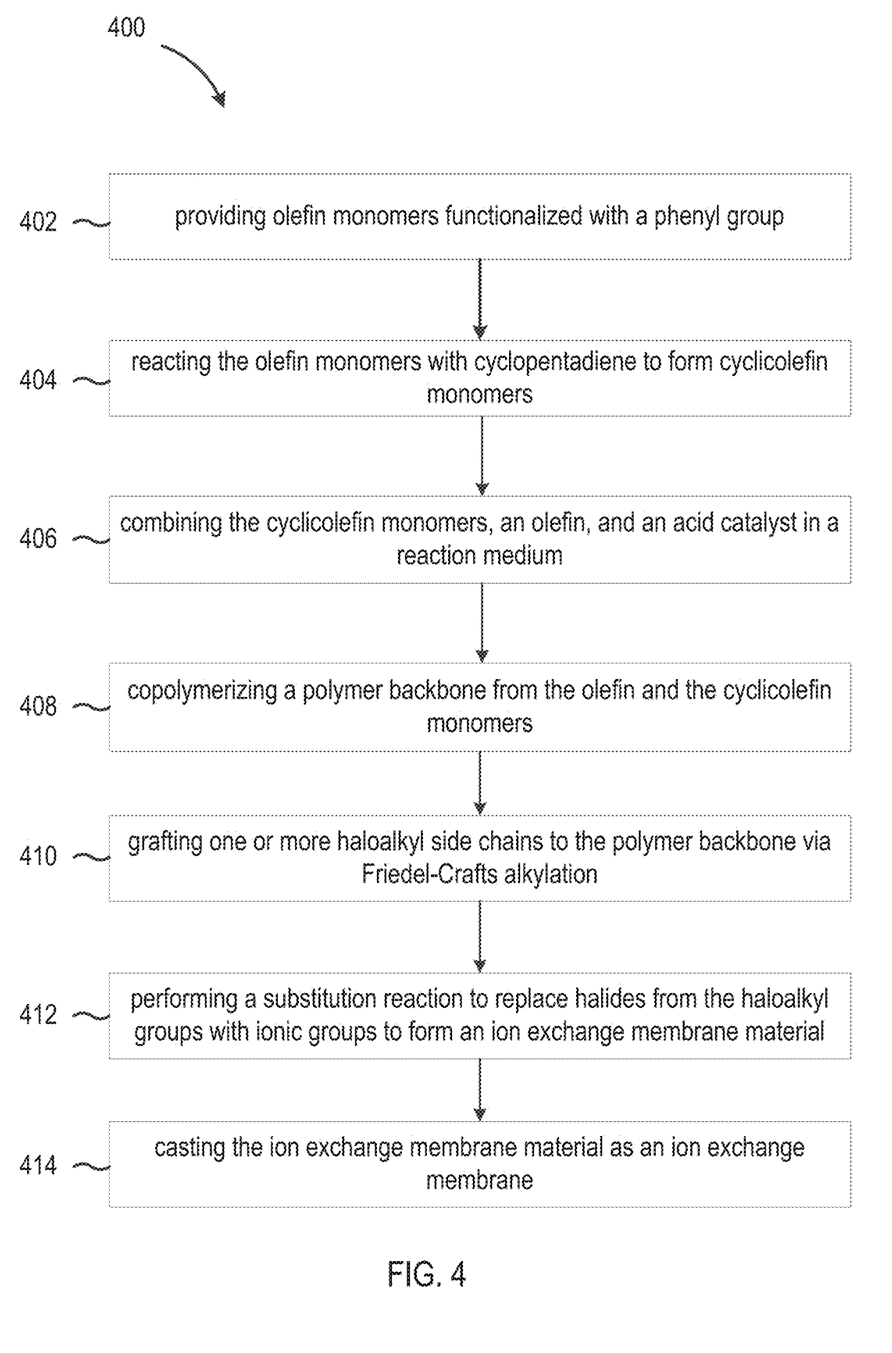
FIG. 4 is a chart of a method of making an ion exchange membrane according to some embodiments of the present disclosure.

Referring now to FIG. 4, some embodiments of the present disclosure are directed to a method 400 of making an ion exchange membrane. In some embodiments, at 402, olefin monomers are provided. In some embodiments, the olefin monomers are functionalized with a phenyl group. At 404, the olefin monomers are reacted with cyclopentadiene to form cyclic olefin monomers. In some embodiments, the cyclic olefin monomers include norbornene. At 406, the cyclic olefin monomers, an olefin, and an acid catalyst are combined in a reaction medium. In some embodiments, the olefin includes ethylene. At 408, a polymer backbone is copolymerized from the olefin and the cyclic olefin monomers. At 410, one or more haloalkyl side chains are grafted to the polymer backbone. In some embodiments, the one or more haloalkyl side chains are grafted to a phenyl group from the cyclic olefin monomers. In some embodiments, grafting 410 is performed via Friedel-Crafts alkylation. At 412, a substitution reaction is performed to replace halides from the haloalkyl groups with ionic groups to form an ion exchange membrane material. At 414, the ion exchange membrane material is cast as an ion exchange membrane. In some embodiments, casting 414 is performed by impregnating the ion exchange membrane material in a reinforcing mesh.

Methods and systems of the present disclosure are advantageous in that they provide ion exchange membrane material fashioned from relatively low-cost reactants, e.g., commodity plastics. Despite the use of the more cost-effective reactants, membranes cast from the ion exchange material still exhibit excellent mechanical properties and dimensional stability. The reaction pathways to achieve the ion exchange membrane material are also relatively convenient while still allowing a high degree of control over the material properties, e.g., rigidity. Membranes composed of the ion exchange materials are also versatile, capable of use as anion/cation exchange polymers for electrochemical energy conversion and storage applications such as fuel cells, electrolysis, actuators, batteries, water treatment systems, energy recovery systems, in vehicles, etc.

Although the invention has been described and illustrated with respect to exemplary embodiments thereof, it should be understood by those skilled in the art that the foregoing and various other changes, omissions and additions may be made therein and thereto, without parting from the spirit and scope of the present invention.

What is claimed is:

1. An ion exchange membrane material comprising a polymer according to Formula II:

(Formula II)

wherein m+n=1, x≥2, Ak is a hydrocarbyl group, and R3 is an ionic group, a polar group, or combinations thereof.

2. The ion exchange membrane material according to claim 1, wherein R3 includes one or more ammonium groups, one or more multication hydrocarbyl chains, one or more spiro-type ammonium groups, one or more sulfonate groups, one or more phosphonate groups, one or more carboxylate groups, one or more alcohols, one or more amines, or combinations thereof.

3. The ion exchange membrane material according to claim 1, wherein m is between about 0.1 and about 0.5.

* * * * *